(No Model.)　　　　　　　　　　　　　　　2 Sheets—Sheet 1.
J. TAMS.
POTTERY MOLD.
No. 285,321.　　　　　　　　Patented Sept. 18, 1883.
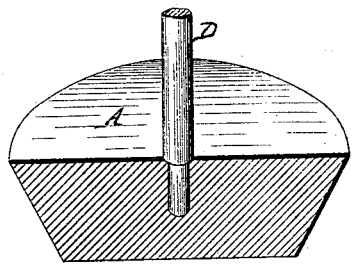
Fig. 1.
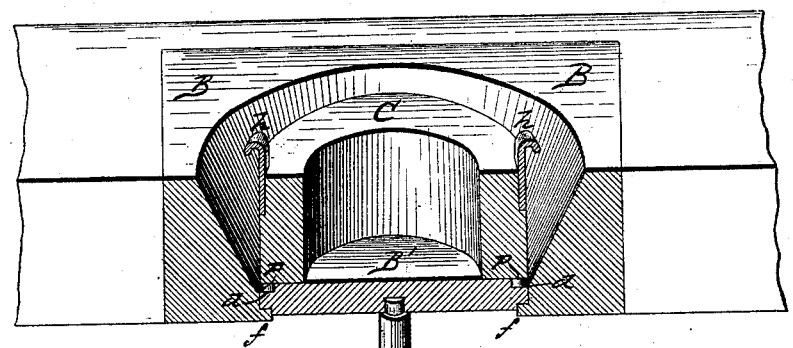
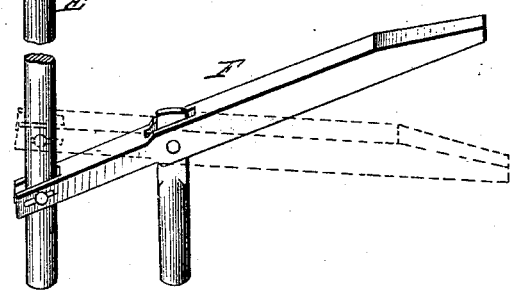
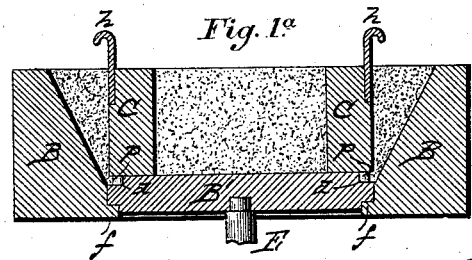
Fig. 1ᵃ.
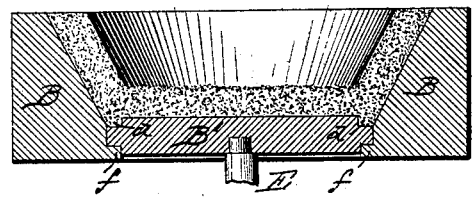
Fig. 1ᵇ.
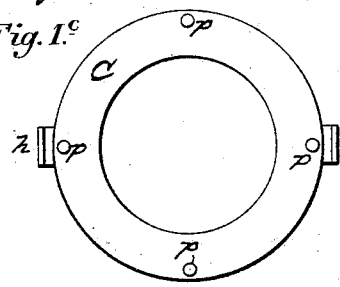
Fig. 1ᶜ.
Witnesses:
J. Henry Kaiser
Geo. G. Penney
Inventor:
JAMES TAMS,
per
Attorney.
N. PETERS, Photo-Lithographer, Washington, D. C.

(No Model.) 2 Sheets—Sheet 2.
J. TAMS.
POTTERY MOLD.
No. 285,321. Patented Sept. 18, 1883.
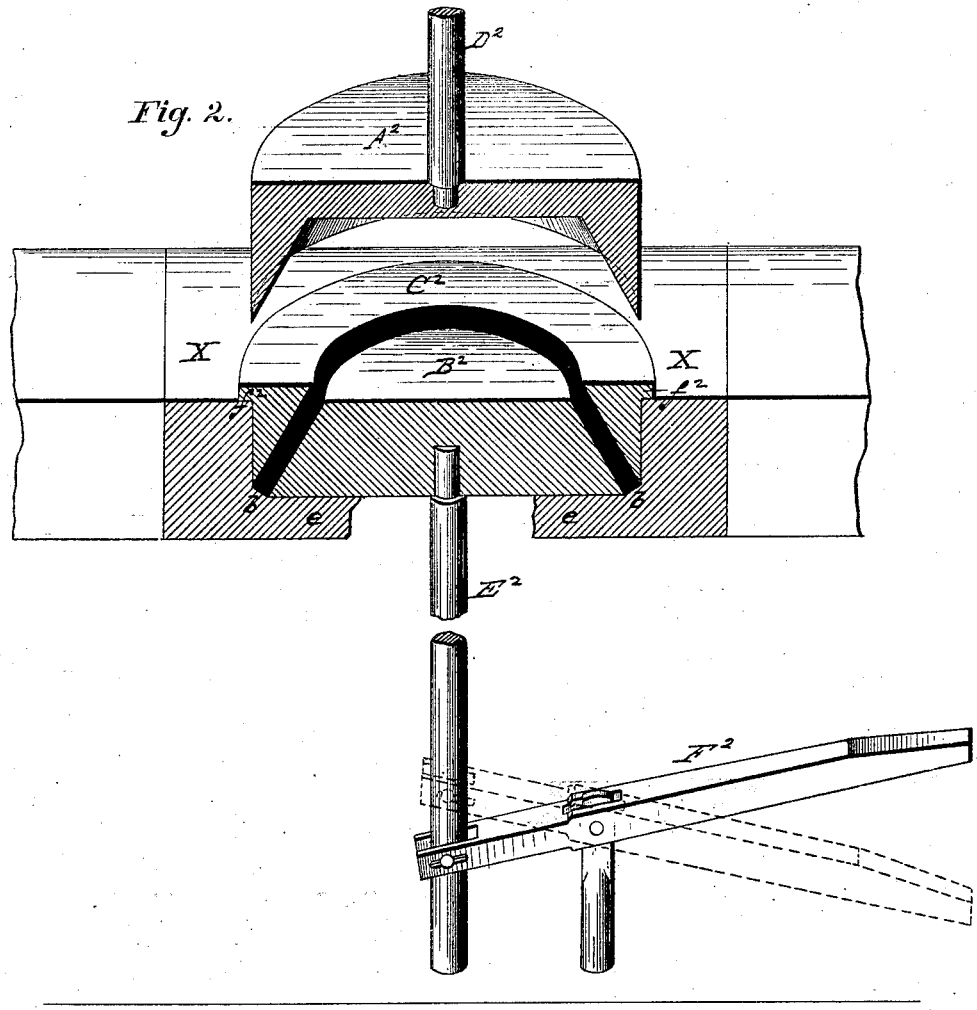
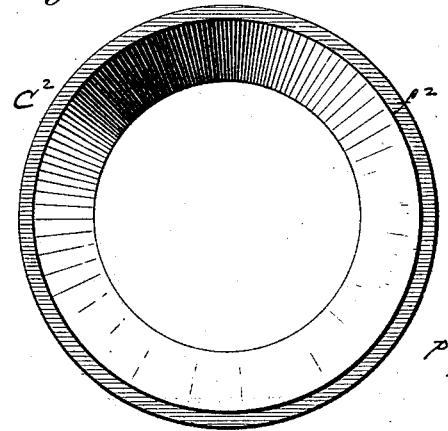
Witnesses:
J. Henry Kaiser
Geo. H. Penney
Inventor:
JAMES TAMS,
per
Attorney.

UNITED STATES PATENT OFFICE.

JAMES TAMS, OF CHAMBERSBURG, NEW JERSEY.

POTTERY-MOLD.

SPECIFICATION forming part of Letters Patent No. 285,321, dated September 18, 1883.

Application filed June 22, 1883. (No model.)

*To all whom it may concern:*

Be it known that I, JAMES TAMS, a citizen of the United States, residing at Chambersburg, in the county of Mercer, New Jersey, have invented a new and useful Improvement in Pottery-Molds, of which the following is a specification.

This invention relates to the production of hollow articles of crockery, china, and like wares, from dust-clay, blood, and sawdust, and other dry pulverous or granular materials, by means of compressing-molds or molding-dies.

Heretofore it has been practically impossible to manufacture serviceable hollow ware of such materials by means of molds or dies, owing to the irregular distribution of the material on or in the lower mold or bed-die by known means, and the fact that any such irregularity rendered the walls of the vessel of unequal density when compressed in the molds or dies, and consequently incapable of enduring expansion and contraction by heat and cold.

The present invention consists in devices or apparatus, hereinafter described and claimed, whereby I am enabled to overcome the difficulty above set forth, and to produce a good and durable article of hollow ware from said pulverous or granular materials, or either of them, with facility and uniformity of result, the product being of equal density at all points, with any required variation in relative thickness and depth.

Two sheets of drawings accompany this specification as part hereof. On Sheet 1, Figure 1 is a perspective vertical section of a set of pottery-molds illustrating this invention. Figs. 1$^a$ and 1$^b$ represent vertical sections through the lower mold or bed-die, illustrating the mode of operation, and Fig 1$^c$ is a bottom view of the inner "gage-mold," seen in relation to the main molds or dies in Figs. 1 and 1$^a$. On Sheet 2, Fig. 2 is a perspective vertical section of another set of pottery-molds, illustrating a modification of this invention, and Fig. 2$^x$ is a bottom view of the gage-mold of this set detached.

Like letters of reference indicate corresponding parts in the several figures.

A A$^2$ may represent upper compressing-molds or molding-dies, and B B$^2$ counterpart lower molds or bed-dies, of ordinary construction.

C C$^2$ represent gage-molds, which I combine with said lower molds or bed-dies for accomplishing the object hereinafter set forth.

D D$^2$ represent vertical rods or stems by which the upper molds or dies, A A$^2$, are supported and worked, and which may be the extremities of compressing-screws, or be reciprocated by any approved press-gear.

E E$^2$ represent rods or stems extending downward from the bottom of the respective sets of molds or dies to the floor below, so as to support the former beneath; and F F$^2$, pedal-levers or treadles connected with said depending rods or stems, and coacting therewith to eject the molded or compressed articles, as hereinafter more fully set forth.

In that set of molds or dies represented on Sheet 1 the upper mold or die, A, is the inner or cameo mold or die, and the lower mold or bed-die, B, is consequently intaglio or sunken, and adapted to form the exterior of an article of hollow ware molded or compressed between these dies. Said lower mold or bed-die is supplemented by a distinct bottom or "riser," B', supported around its margin beneath by a flange, $f$, projecting inwardly from the central aperture of said lower mold or bed-die, and centrally by said depending rod or stem E. The upper surface of said bottom B' is constructed with a marginal depression, $d$, arranged to form a foot-rim on the molded or compressed article, and which, furthermore, coacts with stud-pins $p$ on the bottom of said gage-mold C, so as to facilitate locating the latter centrally within said lower mold or bed-die. There are four of these pins in the example. Three or any greater number will answer the purpose, or equivalents of said pins and groove may be used. Said gage-mold is, furthermore, provided with a pair of handle-ears, $h$, at its upper edge, by which to handle it. Said gage-mold C is so proportioned to the lower mold or bed-die, B, within which it is arranged, as shown in Figs. 1, 1$^a$, that the space within said gage-mold holds enough of the pulverous or granular material to form the bottom of the article which is to be molded or compressed, and the space around said gage-mold within the lower mold or bed-die, B, holds the proper quantity of said material to form the circumferential walls or sides of the article.

In practice I have found that dust-clay occupies about twice the space uncompressed that it does when solidified or compressed. The molds for use in molding dust-clay are consequently proportioned accordingly, which would give the interior of the gage-mold C a capacity of twice the cubical volume of the bottom of the article to be produced, and the annular space around the gage-mold a capacity of twice the cubical volume of the side walls of the product, or thereabout. The differences in bulk between compressed and uncompressed pulverous or granular materials of other kinds may be readily ascertained by experiment and the molds gaged accordingly.

The upper mold or die, A, being in its elevated position and the mold bottom or riser B' in its lowered position, the upper surface of the latter and the inner surface of the mold or die B are slightly oiled, to prevent any adhesion of the article to be molded or compressed, and said gage-mold C is then inserted, as shown in Fig. 1. Said spaces within and around said gage-mold are now loosely filled with the pulverous or granular material to be molded or compressed, and any surplus is brushed off, leaving the molds evenly filled, as represented by Fig. 1$^a$. Said gage-mold C is then lifted vertically and removed, by means of its handles $h$ $h$, with as little disturbance to the material left within the mold B as possible, and the distribution of the material within the mold B is completed by means of the fingers or a suitable tool, as illustrated by Fig. 1$^b$. In doing the latter it is only necessary to spread out the material left by the interior or central measuring-space of said gage-mold so that it shall evenly cover the bottom B', the material for the side walls of the article falling down naturally to about the extent required, while it will retain its position sufficiently to preserve the requisite depth or thickness with uniformity in its upper part. The upper mold or die, A, is now lowered, and the material is compressed with sufficient force to solidify it in the shape determined by the space between the molds or dies A B and the mold-bottom B'. The upper mold or die is then re-elevated by means of the press-gear, and, finally, said bottom B' is elevated by depressing the outer end of said treadle F, as illustrated by dotted lines in Fig. 1, so as to support the compressed article in elevated position, clear of the walls of the mold or die B, to facilitate the removal of the article in customary manner.

In the modification illustrated by Sheet 2 of the drawings, the upper mold or die, A$^2$, is the intaglio or outer die, and the lower mold or bed-die, B$^2$, is the inner or cameo mold or die, and takes the place of, or obviates the employment of, said bottom or riser B' of the set of molds first described. It is supported centrally by said depending rod or stem E$^2$, and around its margin by an inward extension, $e$, of a curb or supporting-die, X, having cylindrical outer walls united with said inward extension by an annular bevel, $b$. Said upper die, A$^2$, has a cylindrical exterior adapted to fit within said cylindrical walls of said supporting-die, while its interior, jointly with the exposed surfaces of said lower mold or bed-die, B$^2$, and said annular bevel $b$, forms or shapes the molded or compressed article. The gage-mold C$^2$ is likewise fitted to the interior of said supporting-die, having a peripheral flange, $f^2$, to rest upon the top of said supporting-die, and an inner surface matching the circumferential walls or sides of said mold or die B$^2$. When this gage-mold C$^2$ is in position within said supporting-die X, as seen in Fig. 2, a space is formed around and above said mold or die B$^2$, substantially of the exact shape of the article to be produced, but of greater thickness and depth proportioned to the compressibility of the material which is to be molded or compressed. Said material is now sifted or otherwise loosely filled upon and around the lower mold or bed-die and brushed off even with the top of said gage-mold. The latter is then steadily lifted, leaving the said material in proper position to be acted upon by the upper and outer mold or die, A$^2$. The latter is now lowered and re-elevated, and the molded or compressed article is lifted clear of said supporting-die X, so as to be readily taken hold of by pressing upon said treadle F$^2$, as in the operation first described.

The respective main molds or molding-dies A B A$^2$ B$^2$, with the said supporting-die X, will be made of iron or steel, in the customary manner, or of like strong and rigid substances, and of suitable proportions for sustaining and resisting the pressure requisite to solidify or compress the pulverous or granular material to be acted upon. The said gage-molds C C$^2$ may be made of suitable wood or the like, requiring simply to be of proper shape and dimensions, with smooth surfaces, and light enough to be handled readily. The other parts of the apparatus shown in the drawings may be of any approved description suited to their respective functions.

The object aimed at or sought to be accomplished by the use of said gage-molds, or either of them, is to apportion or distribute dry pulverous or granular material between compressing-molds or molding-dies by means which insure a correct distribution thereof, so that the same shall form, when solidified or compressed, good hollow ware of even character, quality, and form, and more particularly of even density in its respective parts, as hereinbefore set forth. It will be obvious that this object can be accomplished by various forms of gage-molds and equivalent tools or devices, either by excluding surplus material, as in the example selected for illustration, or by the removal of surplus material from the lower molds or bed-dies, and the modification of said gage-molds to any desired extent within the limits of the object above stated is contemplated and intended.

The particular articles of hollow ware which will be produced by the respective sets of molds or dies shown in the drawings, as aforesaid, are deep round pans or dishes suitable for various culinary or household uses. These are shown, however, merely as examples. Various articles of hollow ware in known or desirable forms or shapes—square, oblong, or oval, as well as round—may be produced in molds or dies adapted to admit a gage-mold or its equivalent and its withdrawal previous to the act of compression, substantially in the manner and for the purpose hereinbefore set forth.

I do not claim herein, in view of the practice of the Patent Office, the process above set forth, comprising the use of my gage-molds or their equivalents in the manner specified, but hereby reserve the right to claim the same in a future application for patent.

Having thus described my said improvement in pottery-molds, I claim as my invention, and desire to patent under this specification—

1. The combination, with a pair of compressing-molds or molding-dies, of a gage-mold, or an equivalent tool or device, for apportioning and distributing pulverous or granular material between said compressing-molds or molding-dies preliminary to the compressing operation, substantially as herein specified, for the purposes set forth.

2. In combination with a horizontal compressing-mold or bed-die adapted to receive the same, the within-described gage-mold C, consisting of a cylindrical or substantially cylindrical ring, having an internal measuring-space, and serving, in combination with the outer walls of said compressing-mold or bed-die, to form an annular space of specific capacity around said gage-mold, substantially as herein specified, for the purpose set forth.

3. In combination with the horizontal compressing-mold or bed-die B and its removable bottom or riser B', the latter constructed with an annular groove or depression, $d$, the gage-mold C, provided on its bottom with stud-pins $p$, adapted to coact with the inner walls of said groove or depression, for the purpose set forth.

JAMES TAMS.

Witnesses:
F. C. LOWTHORP, Jr.,
JOHN A. STEEN.